United States Patent [19]
Vaughn et al.

[11] 3,827,716
[45] Aug. 6, 1974

[54] SAFETY VEST

[76] Inventors: Rudolph Marion Vaughn, 2172 Salt Air Dr., Santa Ana, Calif. 92705; David M. Harney, 3010 Country Club Dr., Glendale, Calif. 91208

[22] Filed: Apr. 11, 1973

[21] Appl. No.: 350,032

[52] U.S. Cl. ............ 280/150 AB, 2/DIG. 3, 9/342, 244/122 B, 24/201 B, 24/201 HE, 280/150 SB, 297/389
[51] Int. Cl. .......................................... B60r 21/08
[58] Field of Search .... 280/150 SB, 150 AB, 150 B; 9/342; 244/122 R, 122 B; 2/DIG. 3, 102, 103, 265; 297/384, 385, 389, 390

[56] References Cited
UNITED STATES PATENTS

| | | | |
|---|---|---|---|
| 2,243,822 | 4/1966 | Lipkin | 244/122 R |
| 2,705,586 | 4/1955 | Young | 297/389 |
| 2,880,788 | 4/1959 | Phillips et al. | 297/389 |
| 2,908,324 | 10/1959 | Muller et al. | 2/102 |
| 3,146,460 | 9/1964 | Henderson | 280/150 AB |
| 3,345,657 | 10/1967 | Peeler et al. | 9/342 |
| 3,369,842 | 2/1968 | Adams et al. | 297/389 |
| 3,414,322 | 12/1968 | Linderoth | 297/389 |
| 3,499,681 | 3/1970 | Benitez et al. | 280/150 SB |
| 3,524,679 | 8/1970 | DeLavenne | 280/150 SB |
| 3,690,696 | 9/1972 | Lincoln | 280/150 SB |

FOREIGN PATENTS OR APPLICATIONS

| | | | |
|---|---|---|---|
| 1,310,485 | 10/1962 | France | 297/389 |
| 1,185,153 | 3/1970 | Great Britain | 297/384 |
| 1,944,821 | 3/1971 | Germany | 280/150 AB |

*Primary Examiner*—David Schonberg
*Assistant Examiner*—John P. Silverstrim
*Attorney, Agent, or Firm*—Pastoriza & Kelly

[57] ABSTRACT

A safety vest for use in an automobile seat includes a back and right and front panel portion having right and front armholes respectively. The upper edge of the back is secured to the back seat of the automobile and the lower right and left hand portions of the front panels are secured on lower sides of the seat. A single fastening strap extends diagonally from the lower right hand portion of the right front panel to the upper left hand portion of the left front panel and is held in place by a magnet within a slot structure for receiving a hook on the end of the fastening belt. Inflatable means responsive to a force greater than 4 g's is arranged to be actuated in front of a person's face for protection in the event of a crash.

5 Claims, 4 Drawing Figures

PATENTED AUG 6 1974  3,827,716

SAFETY VEST

This invention relates generally to safety devices for automobiles and more particularly to an improved safety vest for supporting a driver or other automobile occupants in a manner to minimize injuries in the event of an accident.

BACKGROUND OF THE INVENTION

Both seat belts and shoulder straps are now well known and normally supplied on newer automobiles for restraining a driver and thus minimizing injuries in the event of an automobile accident. Fastening of both a seatbelt and a shoulder harness type structure requires two operations and generally entails the use of both hands of the driver in effecting each coupling. Because of this inconvenience, these devices are not always used by drivers. Moreover, in the event of a serious accident in which large g forces are applied to the driver in a forward direction, the belts themselves tend to cut into the driver's body and can thus cause injury.

The art is crowded with suggested improvements in seatbelts and shoulder harnesses. In fact, the provision of a vest type structure has been proposed wherein a vest is provided with armholes and various fastening means whereby a person's entire chest and shoulder area is properly supported and constrained in the event of an accident. It has been found, however, that the use of a vest type restraining apparatus is often times more difficult to get into and out of than is the problem of simply coupling belts and shoulder harnesses. Further, complete constraint by a vest structure can be dangerous in that a person's head will tend to snap forward under the impact of a collison at high speed, the head itself not being constrained while the shoulders and chest area are constrained.

BRIEF DESCRIPTION OF THE PRESENT INVENTION

The present invention seeks to overcome the disadvantages of seatbelts and shoulder harnesses as well as those of proposed vest type constructions heretofore available and as set forth above. In this respect a modified type of vest is provided.

More particularly, the safety vest comprises a given material having a back portion and right and left front panels with right and left armholes formed therein. A back securing means connects to the upper edge of the back portion of the vest for anchoring the back portion to the upper back of the automobile seat. Right and left side securing means connect to the lower portions of the right and left front panels of the vest for anchoring the vest to lower right and left portions of the seat structure respectively. A fastening strap is connected to the lower exterior portion of the right front panel and is of sufficient length to extend diagonally upwardly across the front of the panels, the free end of the fastening strap being engageable in coupling means on the upper portion of the left front panel.

With the foregoing arrangement, complete support for a person in said seat is provided over substantially his entire chest and shoulder area.

In accord with important features of the invention, the fastening strap can be very easily connected and disconnected by using only one hand and further, adjustments as to the tightness of the vest can be made simultaneously with the coupling of the fastening strap. The material of the vest and securing is such as to constrain fairly rigidly upward movement of the person but to permit forward movement when a certain g (gravitational) force is exceeded. Finally, there may optionally be incorporated an inflatable means adapted to be actuated when a force exceeding 4 g's is exceeded to protect the person's head and face area.

BRIEF DESCRIPTION OF THE DRAWINGS

A better understanding of the invention will be had by referring to the accompanying drawings in which.

DETAILED DESCRIPTION OF THE INVENTION

Figure 1:
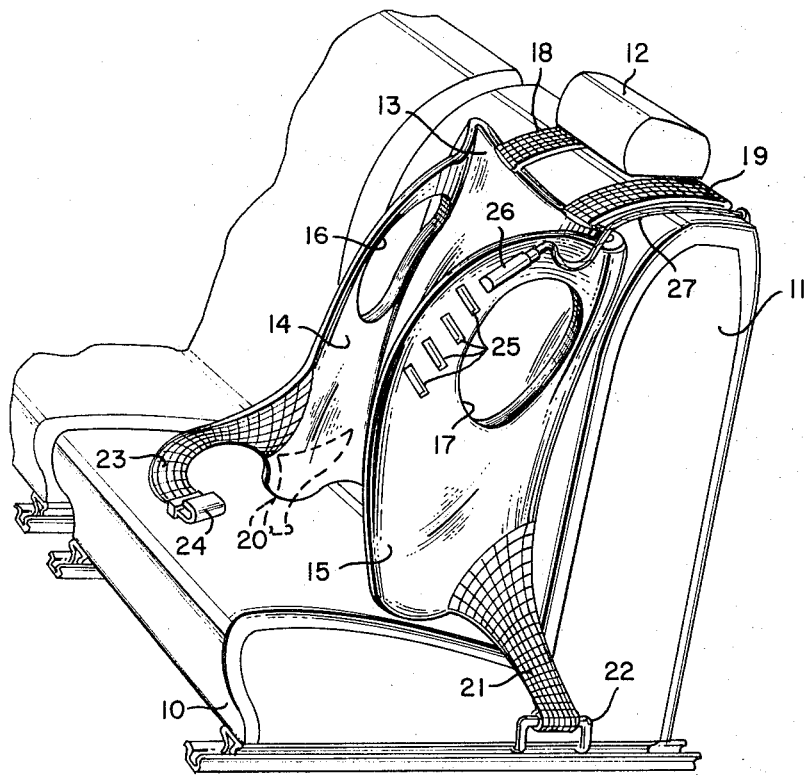
FIG. 1 is a fragmentary perspective view of a front seat of an automobile incorporating the safety vest of this invention showing the vest in open position ready to be used by a person entering the automobile.

Referring to FIG. 1 there is shown an automobile seat 10 with the usual seat back 11 and head rest or head restrainer 12 on the top of the seat back.

The safety vest of the present invention is made up of a given material having a back portion 13 and right and left front panels 14 and 15 with right and left armholes 16 and 17 formed therein.

A back securing means in the form of a pair of belts 18 and 19 are secured to the upper edge of the back portion 13 and thence pass over the top of the back seat 11 where they may be anchored at the upper back of the seat. Right and left side securing means in the form of belts 20 and 21 in turn connect to lower portions of the right and left front panels 14 and 15 with their free ends anchored to lower right and left portions of the seat structure respectively. The anchoring of the left belt 21 is shown at 22 and preferably would be secured to the seat track structure which rides on another track so that adjustment of the seat back and forth in the usual manner will not affect the positioning of the vest on the seat.

A fastening strap 23 connects to the lower exterior portion of the right front panel 14 as shown in FIG. 1 and is of a sufficient length to extend diagonally upwardly across the front of the panels. The free end of the fastening strap 23 terminates in a hook 24 arranged to be coupled within a selected one of a plurality of slots 25 formed on the upper portion of the left front panel 15 as shown.

The safety vest structure is completed in its preferred embodiment by the provision of a gas inflatable means on the upper exterior portion of the left front panel 15 in a position to inflate in front of a person's head when a person is secured in the vest upon actuation. The actuating means in the particular embodiment illustrated for the inflatable means takes the form of a flexible inextensible line 27 connected at one end to the inflatable means 26 and having its other end connected to a stationary point on the back of the seat 11. As shown, this line is provided with a given amount of slack the purpose for which will become clearer as the description proceeds.

Figure 2:
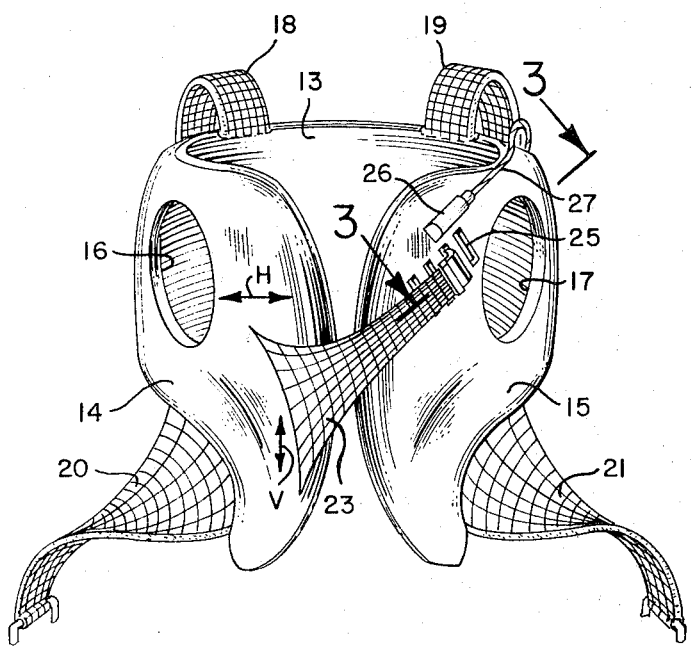
FIG. 2 is a front elevational view of the vest showing it in fastened position across the front.

Referring to the front elevational view of FIG. 2, the manner in which the fastening strap 23 extends across the front of the panels in a generally diagonal direction and hooks into one of the slots 25 is clearly illustrated. The slots themselves are progressively spaced further from the secured end of the fastening means so that the selection of a given slot will enable a person to adjust the degree of tightness of the vest about his chest and shoulder area.

It will be noted in FIG. 2 that there are designated horizontal oppositely disposed arrows H and vertically oppositely disposed arrows V on the right front panel 14. These two arrows are to indicate that the given material making up the vest preferably comprises first and second interwoven synthetic fibers disposed generally in horizontal and vertical directions respectively. The first fibers are stretchable in a horizontal direction as indicated by the arrows H and the second fibers are essentially non-stretchable as indicated by the much closer oppositely directed arrows V.

With the foregoing arrangement, it will be evident that when a person is wearing the vest with the fastening strap 23 properly positioned he will be restrained against any substantial upward movement because of the non-stretchability of the fibers in a vertical direction to thereby provide him protection in the event of roll-over of the automobile.

The back securing means in the form of the belts 18 and 19 as shown in FIG. 2 are comprised of a material characterized in that it will yield to an extended length under a given force loading. In the preferred embodiment of the invention, this given force loading is 4 g's so that in the event of an impact of the front of the car which causes the person to pitch forward so that a restraining force exceeds 4 g's, the belts will yield to an extended position.

The side belts 20 and 21, on the other hand, are preferably non-extendable so that in cooperation with the vest material, the person is constrained against any appreciable vertical movement.

Figure 3:
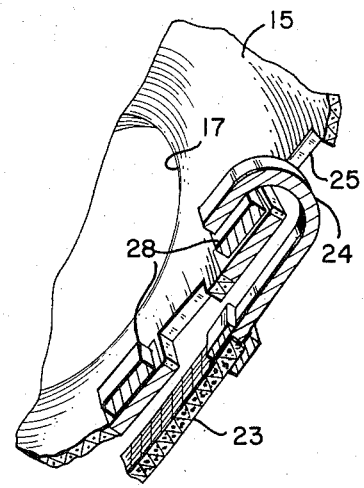
FIG. 3 is a fragmentary perspective view partly in cross section taken in the direction of the arrows 3—3 of FIG. 2; and, FIG. 4 illustrates the position of a person wearing the vest relative to the back of the seat when a given g loading is exceeded.

Referring to FIG. 3, details of the coupling means for the fastening strap 23 are illustrated. In accord with a feature of the invention, the hook portion 24 at the free end of the strap is formed of magnetic material such as steel. Each of the slots in turn has associated with it a magnet such as indicated at 28 on the interior of the left front panel 15 in a position to underlie the turned back portion of the hook 24 when the hook is inserted in a slot 25.

With the foregoing arrangement, it will be seen that the hook 24 of the fastening strap 23 can very readily be inserted in a selected one of the slots 25 by a person using only one hand, the magnetic attraction of the magnet 28 to the steel hook preventing inadvertent uncoupling of the strap. On the other hand, when the person wishes to disengage the fastening strap 23, it is a simple matter to provide sufficient manual upward force on the hook portion as illustrated in FIG. 3 to disengage it from the magnet 28.

Access to and exiting from the vest is therefore extremely simply and requires only a single coupling which can be executed very easily.

Figure 4:
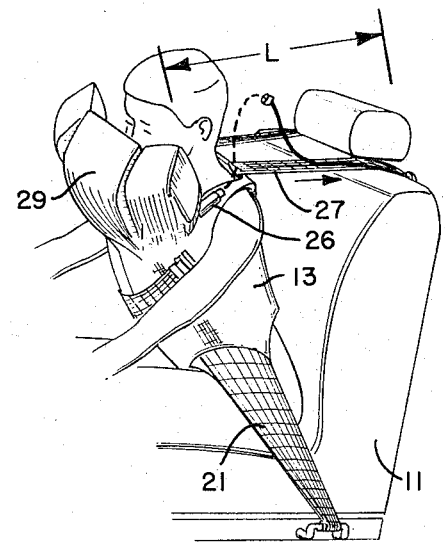

Referring now to FIG. 4, there is illustrated the operation of the inflatable means in the event that an impact causes a force greater than 4 g's to be exerted by the vest on the person wearing the vest. As described heretofore, the back securing belts are designed to yield in response to a force greater than 4 g's. As a consequence of this yielding, the person wearing the vest along with the vest will move forwardly as indicated in FIG. 4. When this forward movement exceeds a given distance indicated by the letter L, the actuating line 27 becomes taut to thereby actuate the inflatable means and cause a bag such as indicated at 29 to inflate in front of the person's face and thereby protect his head.

The inflatable means may take one of many forms well known in the art. For example, a steel container of compressed freon gas can be utilized attached to a collapsed bag and properly positioned such that a pulling force on the line 27 resulting when it becomes taut is sufficient to open a valve on the container and inflate the bag structure.

OPERATION

The operation of the safety vest will be evident from the foregoing description. It will be evident that by making the anchoring points for the back securing belts 18 and 19 and for the lower right and left side belts 20 and 21 removably detachable, the vest can easily be separated from the seat of the automobile. In this respect, it might be desirable to provide vests of different colored fabric to match the upholstery since normally, the vest would remain in the seat.

A user will simply climb into the front seat in the usual fashion slipping his arms through the armholes 16 and 17 which operation is very simple when the vest is in the open position shown in FIG. 1. With a single motion of his right hand, the user can readily couple the fastening belt hook 24 in a suitably selected slot 25 so that the vest will comfortably support him about the chest and shoulder areas. The magnet associated with the slot will serve to prevent inadvertent or unintentional dropping out of the hook for the fastening strap.

The person may then operate his automobile in the usual manner in greater safety than has been provided heretofore by conventional seatbelts and shoulder harnesses. In this respect, the diagonal crossing of the fastening belt 23 and the material of the vest itself which encloses substantially the entire chest and shoulder area assures very excellent support in the event of an accident. Thus, the large area of engagement of the vest material with the person's body distributes a load over the chest and shoulder as opposed to limited load bearing areas which result when conventional seatbelts and shoulder harnesses or belts are used.

In the event the driver wishes to reach forward for example to the glove compartment or the like, it is very simply for him to uncouple the fastening strap 23 with one hand and after resuming his normal driving position, it is again simple for him to recouple the strap.

In the event of a serious impact of the front of the vehicle wherein a restraining force of more than 4 g's would be exerted by the vest, the back securing belts 18 and 19 will yield to thereby absorb the energy of the impact along with the absorption that will take place in the vest itself as a consequence of the stretchability of the horizontally arranged fibers. Moreover, should the forward movement of the person driving the car exceed the given distance L as described in FIG. 4, the bag 29 will automatically be inflated in front of the driver's face to prevent damage to his head such as by the steering wheel or column or front windshield.

Preferably the bag as shown in FIG. 4 is in sections to assume a concave or semi-cylindrical shape and thus protect both the front and side portions of the driver's head.

From the foregoing description, it will thus be evident that the present invention has provided a vastly improved safety vest structure particularly suitable for automobiles but obviously usable as well in other vehicles.

What is claimed is:

1. A safety vest for use in an automobile seat comprising, in combination:
 a. a given material in the shape of a vest having a back portion and right and left front panels with right and left armholes formed therein;
 b. back securing means connected to the upper edge of the back portion of the vest for anchoring the back portion to the upper back of the automobile seat;
 c. right and left side securing means connected to lower portions of the right and left front panels of the vest for anchoring the vest to lower right and left portions of the seat structure, respectively;
 d. a fastening strap connected to the lower exterior portion of the right front panel and of a sufficient length to extend diagonally upwardly across the front of the panels; and,
 e. coupling means on the upper portion of the left front panel for receiving and securing the free end of said fastening strap, whereby support for a person in said seat is provided over substantially his entire chest and shoulder area.

2. A safety vest according to claim 1, in which said coupling means includes a plurality of slots formed in the upper portion of said left front panel at distances progressively further spaced from the end of said fastening means, the free end of said fastening means terminating in a hook formed of magnetic material, each of said slots having magnetic means on the interior of said left front panel associated therewith in a position to underlie the turned back portion of the hook when the hook is inserted in a slot whereby any one of said slots may be selected to secure the free end of the fastening means to provide for tightening of the vest on a person, and whereby the fastening means may be easily uncoupled and coupled with one hand to facilitate exit from and access to the vest.

3. A safety vest according to claim 1, in which said given material comprises first and second interwoven synthetic fibers disposed generally in horizontal and vertical directions respectively, said first fibers being stretchable and said second fibers being essentially non-stretchable whereby a person seated in said vest is restrained from upward movement to thereby provide him protection in the event of roll over of said automobile, said back securing means including at least one belt characterized in that it will yield to an extended length under a given force loading greater than 4 g's whereby energy is absorbed by said belt as well as said vest upon forward movement of the passenger as a result of a g loading greater than 4 g's said right and left side securing means being essentially non-extendable.

4. A safety vest according to claim 3, including gas inflatable means on one of the front panels of the vest in a position to inflate in front of a person's head when a person is secured in said vest when actuated; and actuating means for said inflatable means responsive to a force exceeding 4 g's to inflate said inflatable means.

5. A safety vest according to claim 4, in which said actuating means includes an inextensible line connected between said inflatable means and a stationary point on the back of said seat, said line being provided with a given amount of slack so that when a person moves forward while wearing said vest a distance greater than a given distance, said line becomes taut and thereby actuates said inflatable means, the back securing belt yielding sufficiently to permit forward movement greater than said given distance only when the forward force causing movement exceeds 4 g's.

* * * * *